United States Patent
Durocher et al.

(10) Patent No.: US 9,284,969 B2
(45) Date of Patent: Mar. 15, 2016

(54) THERMAL EXPANSION JOINT CONNECTION FOR SHEET METAL ASSEMBLY

(75) Inventors: Eric Durocher, Vercheres (CA); Guy Lefebvre, Saint-Bruno (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 1057 days.

(21) Appl. No.: 13/404,347

(22) Filed: Feb. 24, 2012

(65) Prior Publication Data

US 2013/0223982 A1 Aug. 29, 2013

(51) Int. Cl.
*F16B 5/02* (2006.01)
*F01D 25/24* (2006.01)
*F16B 5/04* (2006.01)

(52) U.S. Cl.
CPC ............... *F16B 5/0241* (2013.01); *F16B 5/04* (2013.01); *Y10T 29/4932* (2015.01); *Y10T 403/217* (2015.01)

(58) Field of Classification Search
CPC .............. F02C 7/20; F02C 7/00; F01D 25/24; F01D 25/243; F01D 25/246; F16B 5/0225; F16B 2001/0078; Y10T 403/64; Y10T 403/642; Y10T 403/645
See application file for complete search history.

(56) References Cited

U.S. PATENT DOCUMENTS

| | | | |
|---|---|---|---|
| 4,512,699 A | 4/1985 | Jackson et al. | |
| 4,650,385 A | 3/1987 | Jackson et al. | |
| 4,688,378 A * | 8/1987 | Harris | 60/800 |
| 4,921,401 A | 5/1990 | Hall et al. | |
| 4,934,857 A | 6/1990 | Swanson | |
| 4,973,102 A | 11/1990 | Bien | |
| 5,098,765 A | 3/1992 | Bien | |
| 5,129,768 A | 7/1992 | Hoyle et al. | |
| 5,357,744 A | 10/1994 | Czachor et al. | |
| 5,451,116 A | 9/1995 | Czachor et al. | |
| 5,848,874 A * | 12/1998 | Heumann et al. | 415/189 |
| 6,352,404 B1 * | 3/2002 | Czachor et al. | 415/116 |
| 7,152,281 B2 | 12/2006 | Scroggie | |
| 7,900,461 B2 * | 3/2011 | Varney et al. | 60/800 |

* cited by examiner

*Primary Examiner* — Michael P Ferguson
(74) *Attorney, Agent, or Firm* — Norton Rose Fulbright Canada LLP

(57) ABSTRACT

A thermal expansion joint suited for metal sheet component assemblies and method of connection is described. The expansion joint connection is formed by overlapping edge portions of components which are subject to different temperatures. Slot apertures are formed in the edge portion of a first component at predetermined locations and hole apertures are formed in the edge portion of the second component and disposed for confronting alignment with the slot apertures. A connecting sleeve is disposed in each hole aperture and projects through the hole and associated slot and a retention washer is secured over an end of the connecting sleeve on the other side of the second component. A fastener extends through the retention washer and the connecting sleeve to clampingly interconnect the overlapped edge portions of the first and second components.

14 Claims, 6 Drawing Sheets

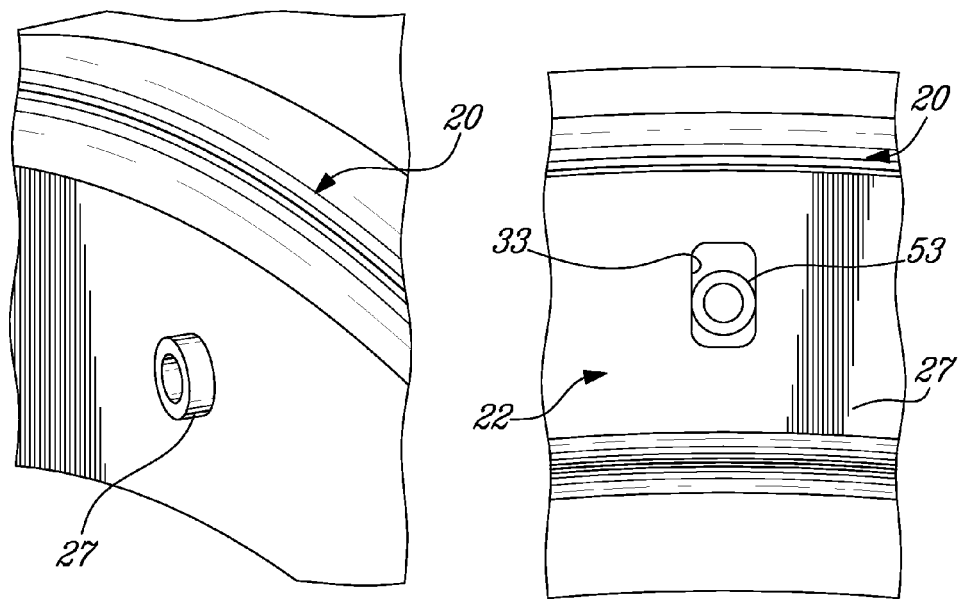
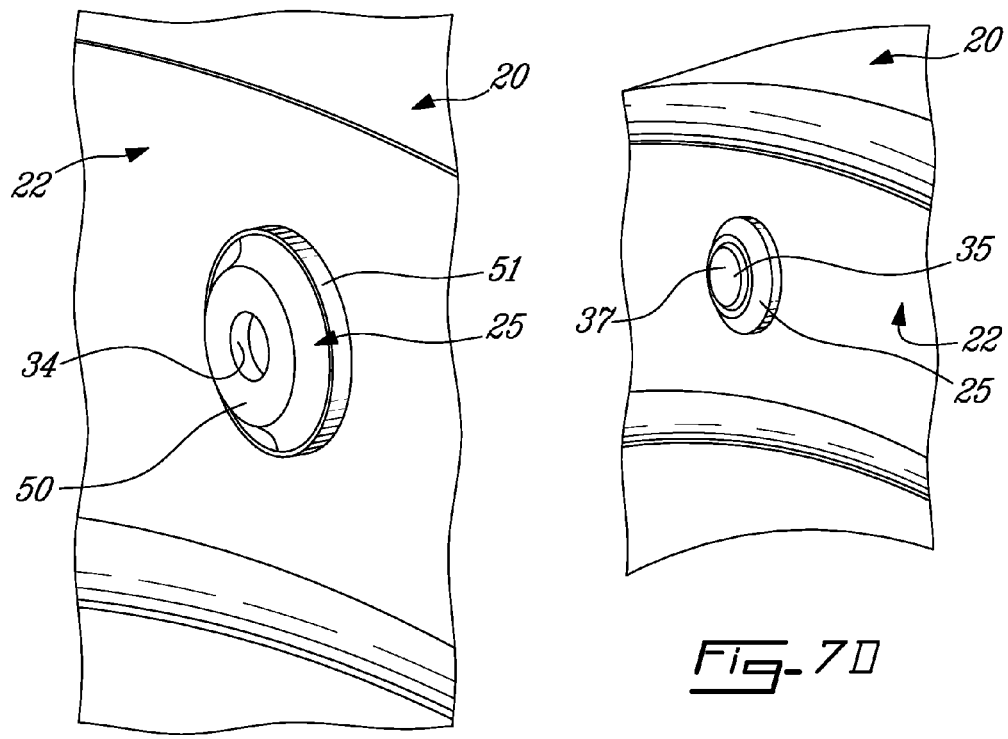

THERMAL EXPANSION JOINT CONNECTION FOR SHEET METAL ASSEMBLY

TECHNICAL FIELD

The application generally relates to gas turbine engine, and more particularly, to a thermal expansion joint suited for use in a sheet metal assembly.

BACKGROUND ART

The latest generations of turbomachinery require more and more lighter and cheaper concepts to reduce weight and costs. Concepts using sheet metal components may be considered to meet that objective but, on the other hand, they present technical challenges, such as, the interconnection of joints of thin sheet metal wall materials, particularly when such materials are joined together and subjected to different temperatures causing thermal expansion and, therefore, movement between the components in the joint connection. This is particularly so when the components form an annular or circumferential joint where thermal expansion takes place in a radial direction.

SUMMARY

Accordingly, from a broad aspect, there is provided a thermal expansion joint connection for sheet metal assembly in a gas turbine engine, comprising first and second concentric components, at least one of the first and second components being a sheet metal component, the thermal expansion joint connection comprising radially extending slot apertures formed in a circumferential edge portion of the first component at predetermined locations thereabout, hole apertures formed in a connecting circumferential edge portion of the second component and disposed for confronting alignment with said slot apertures when said circumferential edge portions of the first and second components are positioned in predetermined overlap facial contact to form a joint, a plurality of connecting sleeves having an abutment projecting outwardly about an end thereof, said connecting sleeves adapted to be disposed in close fit into said hole apertures with said abutment contacting a peripheral surface region about said hole apertures on a first side of said second component, said connecting sleeves having a predetermined length and projecting beyond an opposed side of said second component and through corresponding ones of said slot apertures of the first component, a plurality of retention members configured to abut an outer surface of the first component on a side opposite to said second component and extending beyond opposed ends of said slot apertures, said retention members being mounted to respective ones of said connecting sleeves, a fastener receiving hole in each of said retention members, and a plurality of fasteners for securing said retention members about said connecting sleeves to clampingly interconnect said circumferential edge portions of the first component to the second component while permitting relative radial movement therebetween by displacement of said connecting sleeves with said fasteners therein in associated ones of said radially disposed slot apertures.

According to another broad aspect, there is provided a method for connecting first and second concentric components of a gas turbine engine, wherein the first and second components are subject to different temperatures creating relative radial movement therebetween, at least one of the first and second components being a sheet metal component; the method comprising: forming radially disposed slot apertures in a circumferential edge portion of said first component at predetermined locations thereabout; forming hole apertures in a connecting circumferential edge portion of said second component at locations for confronting alignment with said slot apertures; overlapping in facial relationship said circumferential edge portions of said first and second components with said slots and holes aligned; positioning a connecting sleeve, having an abutment flange projecting outwardly about an end thereof, in close fit into each of said hole apertures with said abutment flange contacting a peripheral surface region about said hole apertures on a first side of said second component and with said connecting sleeve projecting through said hole and slot apertures; positioning a retention washer about a projecting end portion of each of the connecting sleeves on an outer side of the first component for abutment against an outer surface of the first component, each retention washer having a fastener receiving hole; and positioning fasteners through said fastener receiving holes and said connecting sleeves and securing said fasteners to clampingly interconnect said circumferential edge portions of said first component to said second component while permitting relative radial movement between the first and second components by displacement of the connecting sleeves with the fasteners in associated ones of the radially disposed slot apertures.

According to a still further general aspect, there is provided a sheet metal assembly for a gas turbine engine, comprising a first and a second sheet metal component, and at least one thermal expansion joint between the first and second sheet metal components; said at least one thermal expansion joint comprising: a slot aperture formed in an edge portion of the first sheet metal component, a corresponding hole aperture formed in an edge portion of the second sheet metal component and disposed for confronting alignment with the slot aperture, a connecting sleeve mounted on a first side of the second sheet metal component opposite to said first sheet metal component, the connecting sleeve projecting through both the hole aperture and slot aperture, a retention washer engaged over an end portion of the connecting sleeve on a side of the first sheet metal component opposite to the second sheet metal component, a fastener extending through both the retention washer and the connecting sleeve to clampingly interconnect the overlapped edge portions of the first and second sheet metal components while permitting relative radial movement of the first and second sheet metal components by displacement of the sleeve with the fastener in the slot aperture.

BRIEF DESCRIPTION OF THE DRAWINGS

Referring now to the accompanying drawings,

FIGS. 7A to 7D are fragmented isometric views illustrating the steps for assembly and connection of the thermal expansion joint wherein FIG. 7A illustrates the position of the hollow connecting sleeve disposed through the hole of the second component, FIG. 7B illustrates the connecting sleeve extending through the slot of the first component, FIG. 7C illustrates the position of the retention washer over the sleeve projecting end portion and disposed to abut the outer surface of the first component, FIG. 7D illustrates a rivet interconnecting the retention washer and the sleeve together.

DETAILED DESCRIPTION

Figure 1:
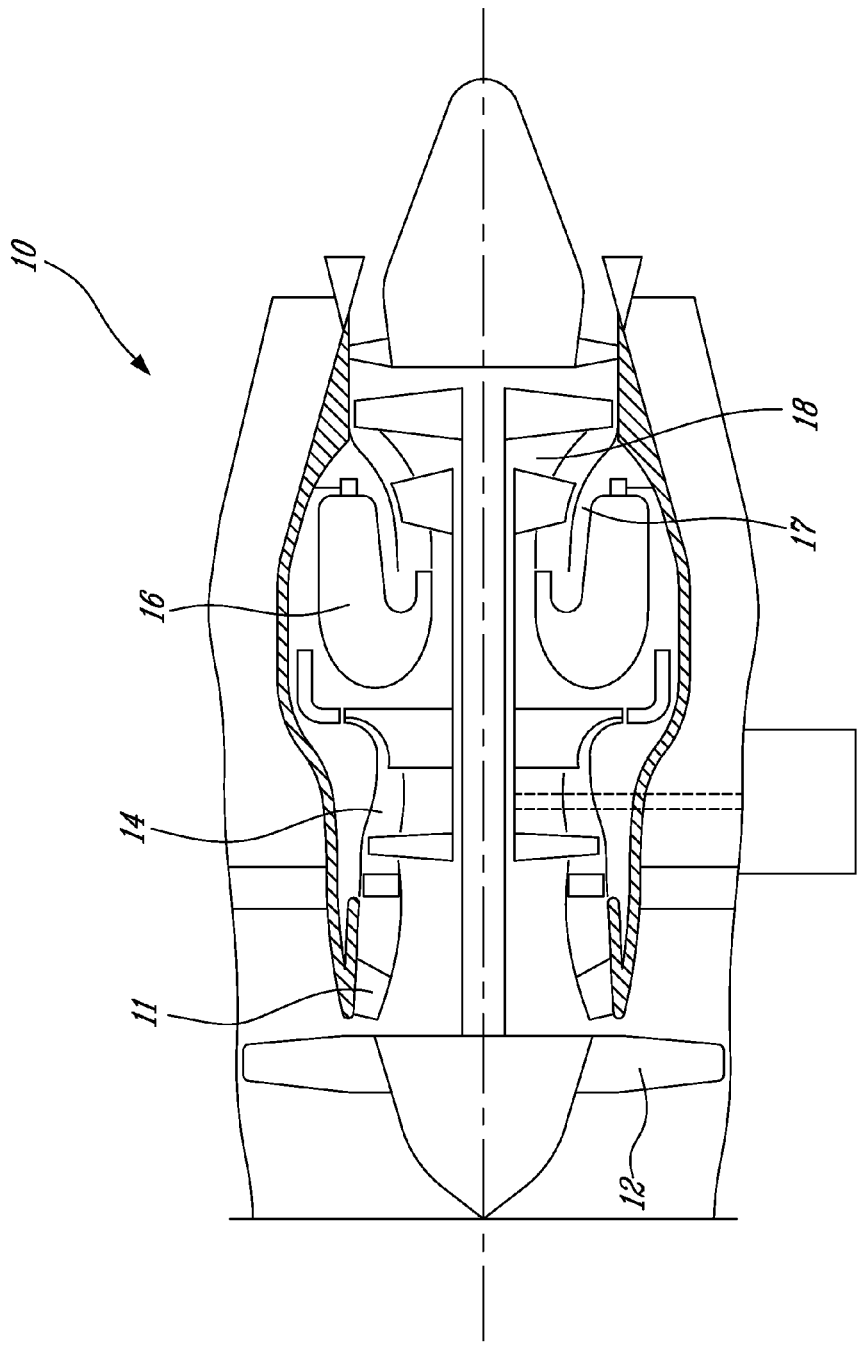
FIG. 1 is a schematic cross-section view of a gas turbine engine.

Referring to the drawings, and more particularly to FIG. 1, there is shown generally at 10 a gas turbine engine of a type preferably provided for use in subsonic flight. The gas turbine engine 10 generally comprises in serial flow communication a fan 12 through which ambient air propelled, a multi-stage compressor 14 for pressurizing the air, a combustor 16 in which the compressed air is mixed with fuel and ignited for generating an annular stream of hot combustion gases. A turbine section 18 extracts energy from the combustion gases to drive the fan 12, the compressor 14 and produce thrust. About the turbine section 18, there is provided shrouds and ducts separating the hot combustion gas stream from other component parts of the engine such as the combustor 16. These component parts are concentrically shaped and may be constructed of thin metal sheet interconnected together. Because some of these components are subject to different temperatures, their concentric joint connection is subject to thermal radial expansion.

Figure 2:
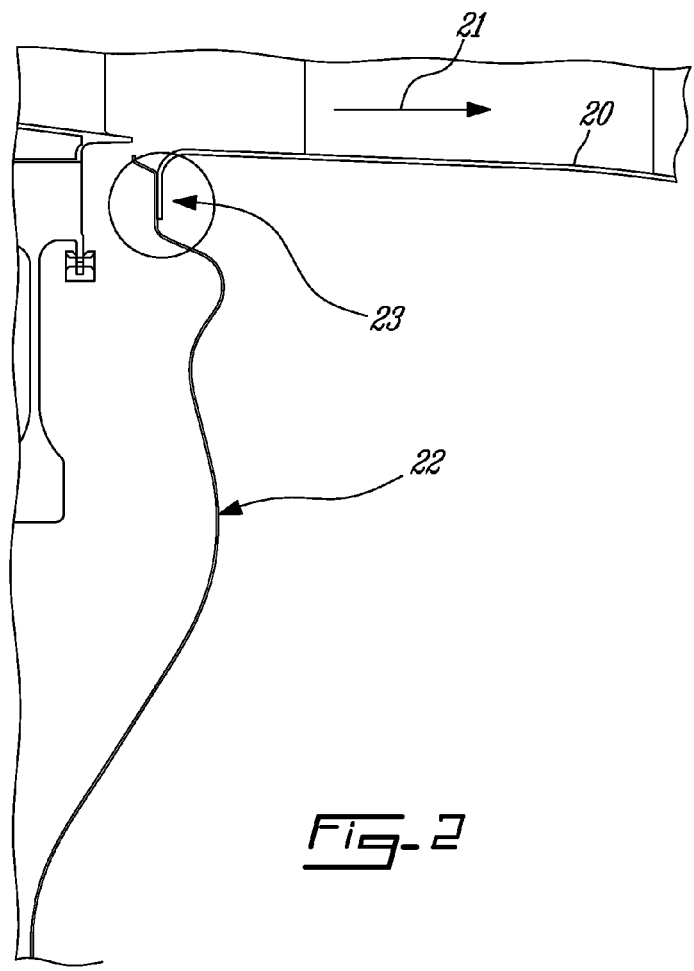
FIG. 2 is a fragmented section view illustrating two interconnected thin metal sheet concentric components of a gas turbine engine interconnected together through an overlap concentric joint connection.

Referring to FIG. 2, there is shown a fragmented section view of the interconnection of two concentric components of a gas turbine engine, herein a sheet metal turbine vane inner duct 20 which is disposed adjacent the hot combustion gas stream 21. The turbine vane inner duct 20 is secured to a sheet metal turbine inner air baffle 22 which is located in a zone of much inferior temperature to the combustion gas stream 21. The turbine vane inner duct 20 is secured to the turbine inner air baffle 22 at an interface location identified by reference numeral 23 where the air baffle 22 and the inner duct 20 form an overlapped joint connection. Because the two component parts, namely the inner duct 20 and the inner air baffle 22, are subjected to different temperatures, there will be radial movement between the components at the interface location 23 and, therefore, there is a need to provide a thermal expansion joint connection to compensate for this radial displacement in the joint.

Figure 3:
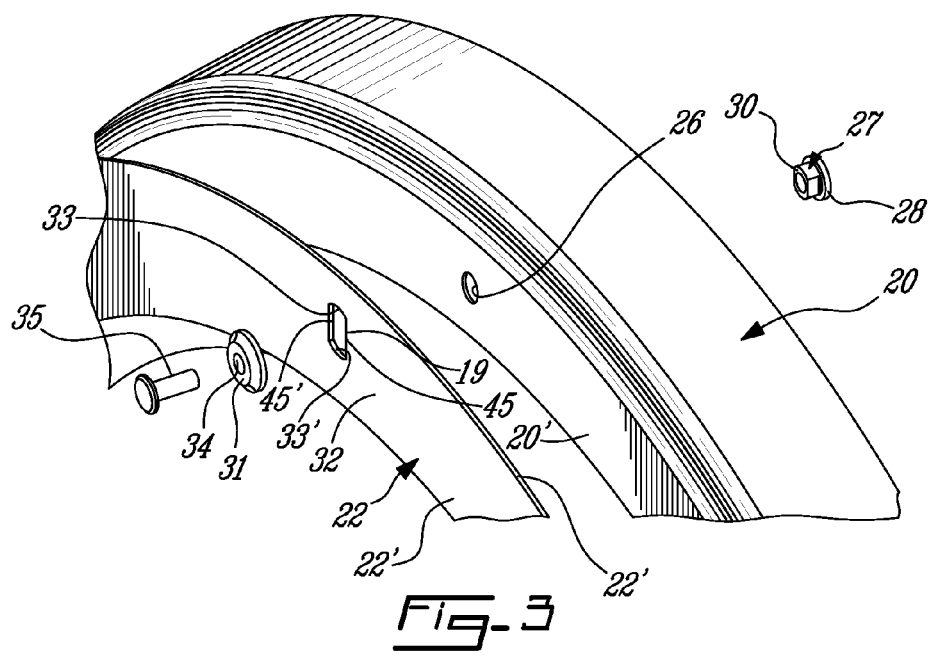
FIG. 3 is an enlarged fragmented exploded perspective view showing parts of the joint connection.
Figure 4A:
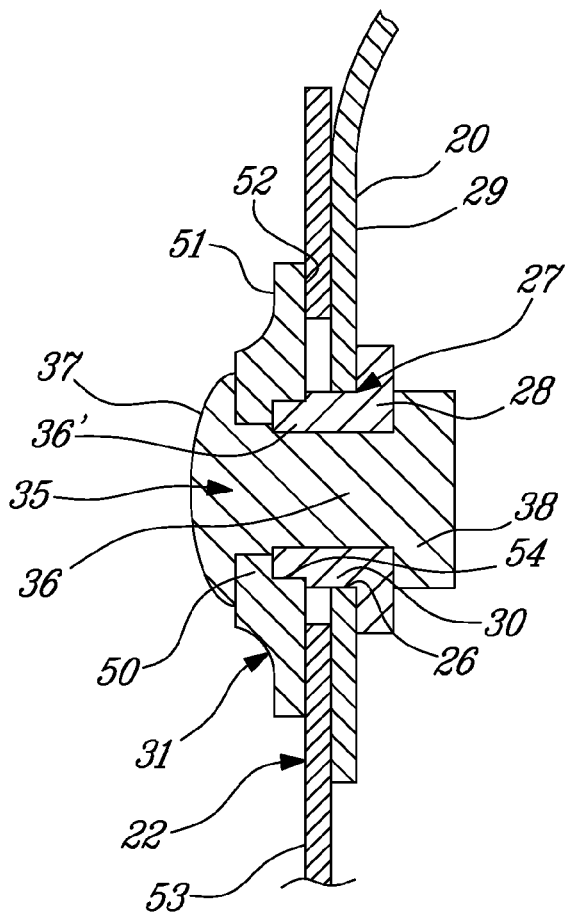
FIG. 4A is a cross-section view of the assembled thermal expansion joint connection secured by a rivet fastener.

With reference now to FIGS. 3 and 4A, there will be described an embodiment of the thermal expansion joint connection for interconnecting a first sheet metal component, herein, for example, the inner air baffle wall 22, to a second sheet metal component, herein the turbine vane inner duct 20, only section thereof being illustrated. These two component parts are constructed of thin sheet metal to reduce costs and weight. As shown in FIG. 2, these component parts have a thin wall configuration and define circumferential edge portions 20' and 22' for interconnection together to form an expansion joint. The edge portions extend in parallel radial planes relative to the centerline of the engine 10.

Figure 5:
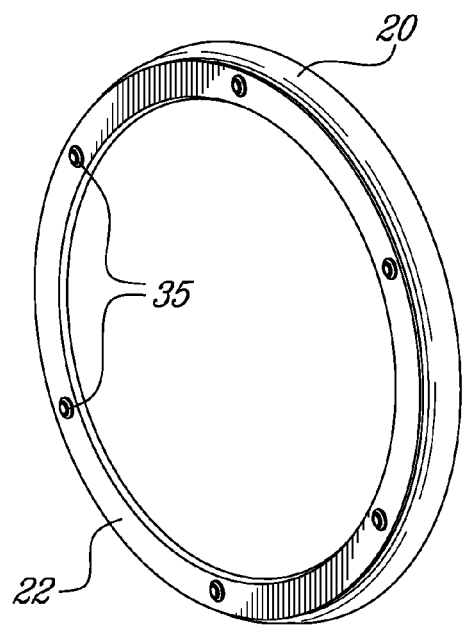
FIG. 5 is an isometric view of a ring component wherein circumferential connecting wall portions formed of two concentric components, subjected to different temperatures, are connected together, FIG. 3 being an exploded view of the circled portion thereof.

Referring concurrently to FIGS. 3 and 5, the thermal expansion joint connection may comprise radial slot apertures 19 formed in equidistantly spaced relationship about the circumferential edge portion 22' of the first component part 22 at predetermined locations, and hole apertures 26 formed in the circumferential edge portion 20' of the second component part 20 and disposed for confronting alignment with the slot apertures 19 when the first and second circumferential edge portions are overlapped in predetermined facial contact. With reference to FIG. 5, it can be seen that the slot apertures 19 are disposed equidistantly spaced apart along the overlapped circumferential edge portions of the concentric components. Therefore, the slot apertures 19 are disposed on radial axes of the circumferential joint in order to provide radial relative movement between the overlapped circumferential edge portions 22' and 20'.

The thermal expansion joint connection may further comprise a hollow connecting sleeve 27 having an abutment means, herein an abutment flange 28, projecting outwardly about an end thereof, herein the end facing the back of the second component part 20. The hollow connecting sleeve 27 is cylindrical in shape and adapted to be disposed in close fit into the hole apertures 26 with the abutment flange 28 contacting a peripheral surface region about an outer surface 29 (FIG. 4a) of the second component part 20. The cylindrical stem section 30 of the hollow connecting sleeve 27 has a predetermined length and projects beyond an opposed front side of the second component part 20 and through the slot aperture 19 of the first component part 22. A retention washer 31 herein shown as being formed has a circular disc which is configured to abut an outer front surface 32 of the first component part 22. It also has a diameter sufficient wherein the washer 31 can extend beyond opposed ends 33 and 33' of the slot aperture 19 to conceal the slot aperture irrespective of the thermal expansion between the first and second component parts.

As better seen in FIG. 3, the retention washer 31 has a central fastener receiving hole 34 therein whereby to receive a fastener 35, as herein shown a rivet fastener, for securing the retention washer 31 to the hollow connecting sleeve 27 whereby to clampingly interconnect the circumferential edge portions 22' and 20' of the first component part 22 to the second component part 20, as clearly shown in FIG. 4A, while permitting relative movement of these parts by displacement of the hollow connecting sleeves 27 in their respective ones of the slots between the ends 33 and 33' of the slot apertures 19.

As shown in FIG. 4A, the rivet fastener 35 has a cylindrical stem 36 formed with a head 37 at one end and a deformable buck tail 38 at the opposed end which is herein shown flared out to abut against the external surface of the abutment flange 28 of the hollow connecting sleeve 27.

Figure 4B:
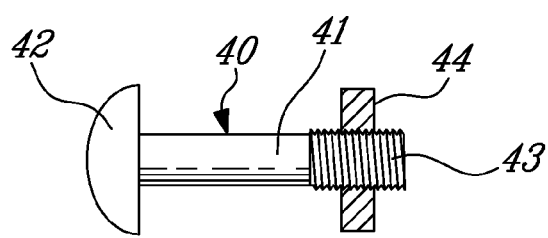
FIG. 4B is a side view of a bolt fastener adapted to replace the rivet fastener illustrated in FIG. 4A.

It is to be understood that other types of fasteners may be used for securing the hollow connecting sleeve 27 and the retention washer 31 together. For example, a bolt fastener such as shown in FIG. 4B may be utilized. That bolt fastener 40 also has a cylindrical shaft 41 with a head 42 formed at one end and a threaded connecting portion 43 at the other end. A suitable lock nut 44 is threaded on the threaded portion 43 for securing the hollow connecting sleeve 27 to the retention washer 31.

Figure 6:
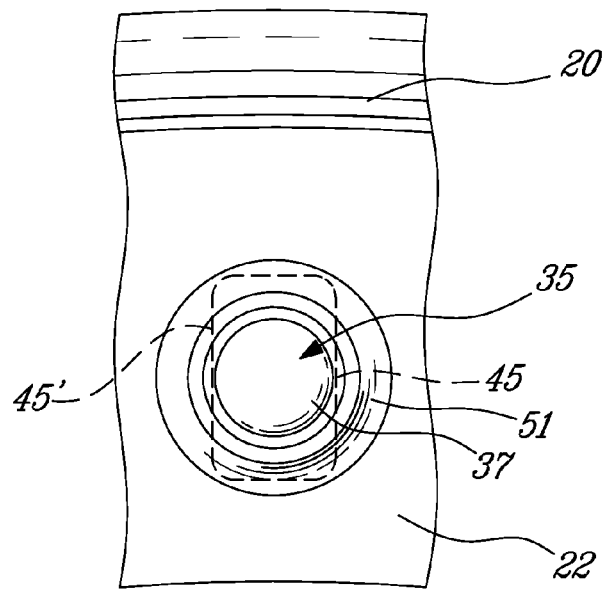
FIG. 6 is a fragmented facial view showing the retention washer and its position relative to the connecting slot with the fastener secured.
Figure 8:
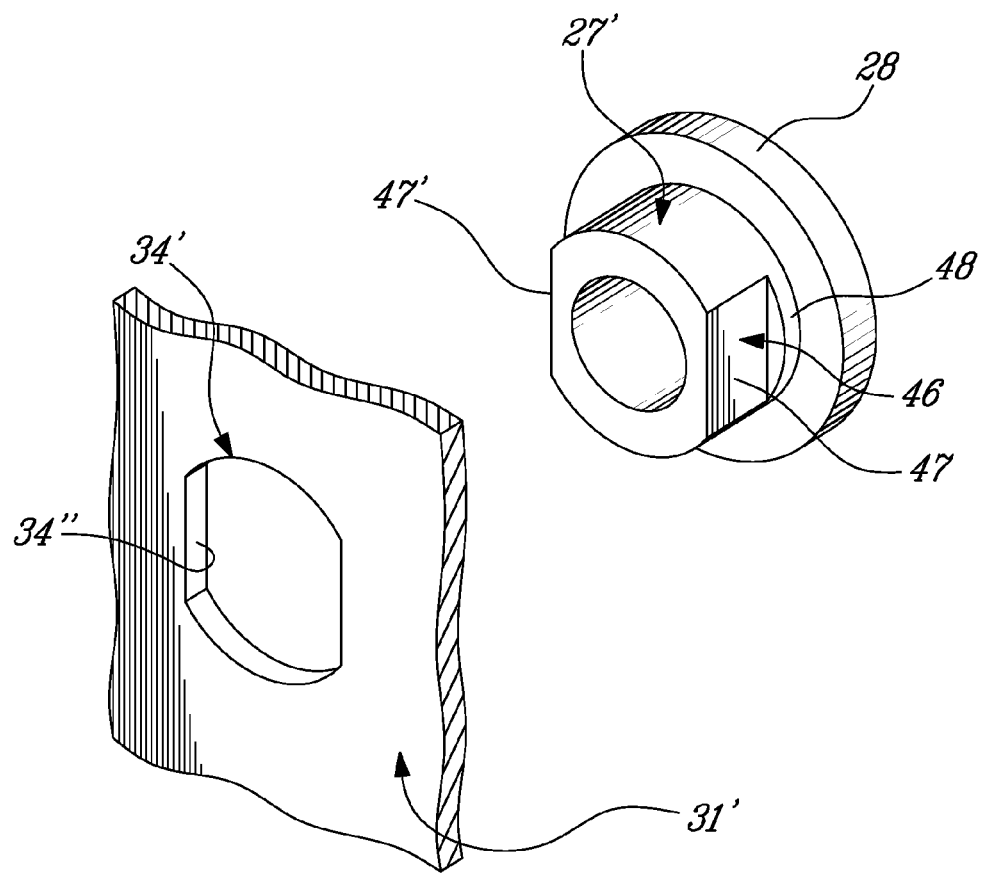
FIG. 8 is an exploded isometric view showing the construction of an alternative design for the hollow connecting sleeve and a fragmented portion of the retention washer.

Referring to FIGS. 3, 6 and 8, it can be seen that the slot apertures 19 are elongated slot apertures defining opposed elongated, spaced-apart parallel edges 45 and 45'. As shown in FIG. 8, the hollow connecting sleeve 27' may be provided with a slot engaging portion 46 provided with opposed flat parallel walls 47 and 47' spaced apart for close sliding fit between the opposed elongated spaced-apart parallel edges 45 and 45' of the slot aperture 19. An advantage of such a configuration is that there is no rotational movement of the sleeve 27' and therefore it reduces wear between the slot aperture and the hollow connecting sleeve 27. A circumferential circular shoulder portion 48 is formed between the slot engaging portion 46 and the abutment flange 28. Of course, the diameter of the slot engaging portion 46 and the shoulder portion is such as to provide a close fit retention in the hole aperture 26. The shoulder portion 48 has a width or a ledge which is substantially equal to the thickness of the thin metal sheet of the second component part 20. As herein shown, the retention washer 31', a fragmented portion only being shown in FIG. 8, would also have its central hole 34' configured with opposed parallel straight edges 34" to receive the slot engaging portion 46 in close fit therein.

Referring again to FIGS. 3, 4A and 6, it can be seen that the retention washer 31 may be formed as a circular disc having a central circular hole 34. This retention washer 31 defines a fastener abutment circumferential outer wall formation 50 against which will abut the head 37 of the fastener 35. This outer wall formation merges into an offset circumferential abutment wall outer section 51 which has a flat inner surface 52 for abutting the outer surface 53 of the first component part 22. An annular seating cavity 54 is defined in the flat inner surface 52 about the hole 34 for receiving therein an outer end section 36' of the cylindrical stem 36 of the hollow connecting sleeve 27. As herein shown, the outer end section 36' of the stem 36 projects beyond the outer surface 53 of the first component part 22. Accordingly, there is formed a rigid stable interconnection between the hollow connecting sleeve 27 and the retention washer 31.

Although the present embodiment is directed to a thermal expansion joint connection for interconnecting concentric component parts of a gas turbine engine 10, as schematically illustrated in FIG. 1, it can also be utilized to connect other sheet metal components subjected to thermal expansion and as used in other turbomachinery or any other machinery or device where at least one of two concentric thin sheet components are interconnected together to form a thermal expansion joint to compensate for the difference in thermal expansion of interconnected parts being subjected to different temperatures.

With reference to FIGS. 7A to 7D, there is briefly summarized the method of constructing the thermal expansion joint connection as described herein, wherein two component parts are interconnected together through a joint capable of providing radial relative movement between the component parts, there is provided the steps of forming radially oriented slot apertures in a first component at predetermined equidistantly spaced-apart locations. Hole apertures are formed in the second component at locations for confronting alignment with the slot apertures. The two component parts have circumferential connecting edge portions which are overlapped in facial relationship wherein the slots and holes of these components are aligned. A hollow connecting sleeve, having an abutment flange at an end thereof is disposed to project through the hole and slot apertures and in close sliding fit therein with the abutment flange contacting a peripheral surface region about the hole apertures on a first side of the second component and with the hollow connecting sleeve projecting through the hole and slot apertures. A retention washer is disposed about the projecting end portion of the hollow connecting sleeve on an outer side of the first component for abutment against an outer surface of the first component. The retention washer has a central fastener receiving hole and a diameter suitable to conceal the slot during thermal expansion of the interconnected components.

The method further comprises securing a fastener through the central fastener receiving hole of the washer and the hollow sleeve to clampingly interconnect the circumferential connecting edge portions of the first component to the second component while permitting relative movement between the first and second components by displacement of the sleeves with their fasteners in associated ones of the radially disposed slot apertures.

The above description is meant to be exemplary only, and one skilled in the art will recognize that changes may be made to the embodiments described without departing from the scope thereof. For instance, the thermal expansion joint connection could be used to secure one sheet metal component to a none-sheet metal component. Also according to some applications, a single thermal expansion joint could be used between the components to be interconnected. It is, therefore, intended to cover any obvious modifications provided that these modifications fall within the scope of the appended claims.

What is claimed is:

1. A thermal expansion joint connection for sheet metal assembly in a gas turbine engine, the thermal expansion joint connection comprising:

concentric first and second annular components for being mounted concentrically about an axis of the gas turbine engine, at least one of the first and second components being a sheet metal component;

the first component comprising an annular flange having radially extending slot apertures formed in a radially extending circumferential edge portion of the flange of the first component at predetermined locations thereabout, wherein said radially extending slot apertures are elongated slot apertures, each slot aperture defining opposed elongated spaced-apart parallel edges;

the second component comprising an annular flange having hole apertures formed in a radially extending connecting circumferential edge portion of the flange of the second component and disposed for confronting alignment with said slot apertures when said circumferential edge portions of the first and second components are positioned in predetermined overlap facial contact to form a joint;

a plurality of connecting sleeves each having an abutment projecting outwardly about an end thereof, said connecting sleeves being disposed in close fit into said hole apertures with said abutment contacting a peripheral surface region about said hole apertures on a first side of said second component opposite said first component, said connecting sleeves having a predetermined length and projecting beyond a side of said second component abutting the first component and through corresponding ones of said slot apertures of the first component, wherein each of said connecting sleeves has a slot engaging portion provided with opposed flat parallel walls spaced apart for close sliding fit between said opposed elongated spaced-apart parallel edges of said slot apertures;

a plurality of retention members, each said retention member having a hole centrally disposed therethrough and an outer wall formation for abutting the head of a fastener extending therethrough, said retention members abutting an outer surface of the first component on a side opposite to said second component and extending beyond opposed ends of said slot apertures, the hole receiving a corresponding one of the connecting sleeves, thereby allowing said retention members to be fitted over respective ones of said connecting sleeves; and a plurality of fasteners extending through and securing said retention members to said connecting sleeves to clampingly interconnect said circumferential edge portions of the first and second component components while permitting relative radial movement between the first and second components by displacement of said connecting sleeves with said fasteners therein in associated ones of said radially extending slot apertures.

2. A thermal expansion joint connection as claimed in claim 1 wherein each said fastener is a rivet, said rivet having a cylindrical shaft formed with a head at one end and a deformable buck tail at the opposed end.

3. A thermal expansion joint connection as claimed in claim 1 wherein each said fastener is a bolt having a cylindrical shaft formed with a head at one end and a threaded section about said cylindrical shaft adjacent an opposed end for receiving a nut in engagement therewith.

4. A thermal expansion joint connection as claimed in claim 1 wherein each said connecting sleeve is a cylindrical sleeve of circular transverse cross-section.

5. A thermal expansion joint connection as claimed in claim 1 wherein each of said connecting sleeves has a circumferential circular shoulder portion between said slot engaging portion and said abutment, said circular shoulder portion having a diameter for close fit retention in said hole aperture and a depth substantially equal to the thickness of said second component, said hole in said retention member being configured for receiving the slot engaging portion of each connecting sleeve in close fit engagement and having opposed straight edge segments.

6. A thermal expansion joint connection as claimed in claim 5 wherein said abutment of each said connecting sleeve is a transverse circumferential flange formed about said end of said connecting sleeve and having a diameter greater than the length of said slot apertures.

7. A thermal expansion joint connection as claimed in claim 1 wherein each said retention member is a circular disc, said outer wall formation of each said retention member merging into an offset circumferential outer abutment wall section having a flat inner surface for abutting said outer surface on said opposite side of said first component, and an annular seating cavity in said flat inner surface about said hole for receiving therein an outer end portion of said connecting sleeve projecting beyond said outer surface on said opposite side of said first component.

8. A thermal expansion joint connection as claimed in claim 1 wherein each of the connecting sleeves extends in tight fit engagement with an associated one of the retention members.

9. A thermal expansion joint connection as claimed in claim 8, wherein a seating cavity is defined in each of the retention members, and wherein each of the connecting sleeves has a stem portion which is received in tight fit engagement within the seating cavity of the associated one of the retention members.

10. A method for connecting concentric first and second annular components of a gas turbine engine, wherein the first and second components are subject to different temperatures creating relative radial movement therebetween, at least one of the first and second components being a sheet metal component; the method comprising:

(i) forming radially disposed slot apertures in a radially extending circumferential edge portion of an annular flange of said first component at predetermined locations thereabout, each of said radially disposed slot apertures defining opposed elongated spaced-apart parallel edges;

(ii) forming hole apertures in a connecting radially extending circumferential edge portion of an annular flange of said second component at locations for confronting alignment with said slot apertures;

(iii) overlapping in facial contact said circumferential edge portions of said first and second components with said slot apertures and hole apertures aligned;

(iv) positioning a connecting sleeve, having an abutment flange projecting outwardly about an end thereof, in close fit into each of said hole apertures with said abutment flange contacting a peripheral surface region about said hole apertures on a first side of said second component opposite said first component and with said connecting sleeve projecting through said hole and slot apertures, each of the connecting sleeves having a slot engaging portion provided with opposed flat parallel walls spaced-apart for close sliding fit between the opposed elongated spaced apart parallel edges of the slot apertures;

(v) positioning a retention washer having a receiving hole centrally disposed therethrough about a projecting end portion of each of the connecting sleeves on an outer side of the first component for abutment against an outer surface of the first component, each retention washer comprising an outer wall formation for abutting the head of a fastener extending therethrough; and (vi) positioning fasteners through said receiving holes in said retention washers and respective holes extending longitudinally through said connecting sleeves and securing said fasteners to clampingly interconnect said circumferential edge portions of said first component to said second component while permitting relative radial movement between the first and second components by displacement of the connecting sleeves with the fasteners in associated ones of the radially disposed slot apertures.

11. A method as claimed in claim 10 wherein said step (vi) comprises securing one of a rivet or bolt fastener.

12. A sheet metal assembly for a gas turbine engine, the sheet metal assembly comprising:

concentric first and second annular sheet metal components, and at least one thermal expansion joint between the first and second sheet metal components; said at least one thermal expansion joint comprising:

a slot aperture formed in a radially extending edge portion of an annular flange of the first sheet metal component, the slot aperture having opposed parallel radially extending straight edges;

a corresponding hole aperture formed in a radially extending edge portion of an annular flange of the second sheet metal component and disposed for confronting alignment with the slot aperture;

a connecting sleeve mounted on a first side of the second sheet metal component opposite to said first sheet metal component, the connecting sleeve projecting through both the hole aperture and slot aperture, the connecting sleeve having a slot engaging portion provided with opposed flat parallel walls spaced-apart for closed sliding fit between the opposed radially extending straight edges of the slot aperture;

a retention washer having a hole centrally disposed therethrough engaged over an end portion of the connecting sleeve on a side of the first sheet metal component opposite to the second sheet metal component, the retention washer comprising an outer wall formation for abutting the head of a fastener extending therethrough; and a fastener extending through both the retention washer and the connecting sleeve to clampingly interconnect the overlapped edge portions of the first and second sheet metal components while permitting relative radial movement of the first and second sheet metal components by displacement of the connecting sleeve with the fastener in the slot aperture.

13. The sheet metal assembly defined in claim 12, wherein the first and second sheet metal components are concentric ring components, and wherein at least two thermal expansion joints are provided about the circumference of the concentric ring components.

14. The sheet metal assembly defined in claim 13, wherein the first sheet metal component is a turbine inner air baffle, and wherein the second sheet metal component is a turbine vane inner duct.

* * * * *